(12) United States Patent
Yi

(10) Patent No.: US 7,269,761 B2
(45) Date of Patent: Sep. 11, 2007

(54) SYSTEM AND METHOD FOR REMOTE DIAGNOSTICS FOR AN IN-FLIGHT ENTERTAINMENT SYSTEM

(75) Inventor: Jason Kyong-min Yi, Irvine, CA (US)

(73) Assignee: Thales Avionics, Inc., Irvine, CA (US)

( * ) Notice: Subject to any disclaimer, the term of this patent is extended or adjusted under 35 U.S.C. 154(b) by 117 days.

(21) Appl. No.: 11/136,122

(22) Filed: May 24, 2005

(65) Prior Publication Data

US 2005/0273662 A1    Dec. 8, 2005

Related U.S. Application Data

(60) Provisional application No. 60/574,872, filed on May 27, 2004.

(51) Int. Cl.
*G06F 11/00* (2006.01)
*H04N 7/18* (2006.01)

(52) U.S. Cl. .................. 714/46; 714/27; 714/57; 725/76

(58) Field of Classification Search ............. 714/27, 714/57; 725/76
See application file for complete search history.

(56) References Cited

U.S. PATENT DOCUMENTS

| | | | |
|---|---|---|---|
| 6,175,934 B1 * | 1/2001 | Hershey et al. | 714/25 |
| 6,516,427 B1 * | 2/2003 | Keyes et al. | 714/25 |
| 6,813,777 B1 * | 11/2004 | Weinberger et al. | 725/76 |
| 6,876,905 B2 * | 4/2005 | Farley et al. | 701/3 |
| 6,973,479 B2 * | 12/2005 | Brady et al. | 709/203 |
| 7,114,171 B2 * | 9/2006 | Brady et al. | 725/77 |
| 2003/0014691 A1 * | 1/2003 | Abdelilah et al. | 714/25 |
| 2003/0208579 A1 | 11/2003 | Brady, Jr. et al. | |
| 2004/0205397 A1 * | 10/2004 | Rajiv et al. | 714/25 |
| 2005/0188260 A1 * | 8/2005 | First et al. | 714/25 |
| 2006/0143661 A1 * | 6/2006 | Funderburk et al. | 725/76 |

OTHER PUBLICATIONS

Subramanian, "In-Flight Entertainment," White Paper, Wipro Technologies, pp. 1-13 (2002).

* cited by examiner

*Primary Examiner*—Scott Baderman
*Assistant Examiner*—Joshua Lohn
(74) *Attorney, Agent, or Firm*—Drinker Biddle & Reath LLP

(57) ABSTRACT

A remote diagnostics kit is provided to permit an in-flight entertainment system of an aircraft to be diagnosed remotely by an operator who is not on-site with the aircraft. The kit includes a remote computer, such as a laptop, that is connected to the IFE or a unit to be diagnosed. A technician operating a base computer accesses the remote computer over an appropriate communications network or series of networks. For example, in an embodiment, the remote computer includes a wireless modem, such as a cellular telephone modem, which the base computer accesses over the Internet. The base computer and remote computer are equipped with appropriate software to permit communication between the base and remote computers. Accordingly, through the base computer, the technician can command operation of a diagnostics program running at the remote computer, and output from the diagnostics program is transmitted to the base computer for display.

12 Claims, 6 Drawing Sheets

SYSTEM AND METHOD FOR REMOTE DIAGNOSTICS FOR AN IN-FLIGHT ENTERTAINMENT SYSTEM

CROSS-REFERENCE TO RELATED PATENT APPLICATIONS

This patent application claims the benefit of U.S. Provisional Patent Application No. 60/574,872, filed May 27, 2004.

FIELD OF THE INVENTION

This invention pertains to the field of testing of electronic components, and particularly relates to a system for remotely diagnosing components of an in-flight entertainment system of an aircraft.

BACKGROUND OF THE INVENTION

In-flight entertainment (IFE) systems are generally known. An IFE is a system on an aircraft that can provide various services to passengers, such as video and audio, and modem IFS systems also perform other task such as operating reading lights and flight attendant call indicators. On an airplane, an IFE comprises various components networked together to perform the desired functions.

FIG. 1 illustrates an example of a simplified architecture 100 for an IFE system. In architecture 100, a backbone data network 110 is coupled to a management terminal 112, a digital service unit (DSU) 114 and an audio and video controller 116. In this example, backbone data network 110 is coupled to front-end network 120 that couples DSU 114 to a plurality of area distribution boxes (ADBs) 122 and 124 and tapping unit 126, which drives display 128. A broadcast audio and radio frequency (RF) signal bus 130, in this example, carries an output of audio and video controller 116 to ADBs 122 and 124 and to tapping unit 126.

Management terminal 112 typically provides a user interface to the IFE system for flight crewmembers or maintenance staff. For example, a user can specify software configurations for some of the other system units or can allow a user to enable or disable the availability of audio/video content or wide area network access to passenger on the aircraft. For example, a user can select a movie for output to tapping unit 126 from audio and video controller 116 via broadcast bus 130.

Area distribution boxes 122 and 124 are each generally a local seat-level routing device that controls distribution of signals from the front-end network 120 and broadcast bus 130 to seat electronics devices that provide services to passengers. The ADBs also receive and route messages from the seat boxes to provide, for example, overhead reading lights, attendant call indicators, and channel selections.

Audio and video controller 116 generally operates as an entertainment headend controller that can perform a variety of functions. Controller 116 may interact with input devices, such as cameras, video players, audio players, or similar content providing devices. The content is provided to ADBs 122 and 124 or tapping unit 126 via broadcast bus 130. For example, management terminal 112 may be used to send a command to controller 116 to select a movie playing in a video player for transmission over broadcast bus 130 to tapping unit 126 for output on display 128. Controller 116 may also be used to relay inputs from the cockpit, for crew announcements and flight information and display.

Digital server unit 114 provides analog and video outputs derived from digital content stored, for example, on a hard disk drive, compact disk, or other storage devices. The DSU is typically modular in construction and includes component subsystems that, for example, provided control and interface functions, audio or video decoding, analog buffering, RF modulation, and multiplexing of audio or video signals into a combined signal. For example, a DSU may have a movie stored on hard drive whose digital audio and video data is decoded and RF modulated for output onto broadcast bus 130 for output to ADBs 122 and 124 or tapping unit 126. Alternatively, DSU 114 may be configured to transmit the audio and video data for the movie over network 120 to ADBs 122 and 124 and to tapping unit 126. In this alternative, the DSU, which typically includes a central processing unit (CPU), accesses digital content stored on a disk drive and streams the digital content using TCP/IP protocols through a network interface to network 120 in order to provide the digital content to video or audio clients, where the digital data is decoded and converted to analog audio and/or video signals.

Video content is typically stored on a storage unit, such as a high performance disk drive, of the DSU in a compressed format, such as the Motion Picture Expert Group (MPEG) formats MPEG-1 and MPEG-2. Similarly, the audio content is typically stored in a compressed format, such as MPEG-3 (MP3). The storage unit is typically accessed using a high speed interface, such as a SCSI interface, which may be accessed by a technician in order to load content onto the storage unit. Multiple DSUs may be utilized in order to provide content to ADBs, tapping units, or other client devices.

Tapping unit 126 is typically a device that is addressable via network 120 for tapping a broadcast signal provided via broadcast bus 130 or a digital stream provided via network 120 for distributing selectable or predetermined portions of the signal to one or more display units, such as display 128, which may be for viewing by a single passenger or multiple passengers. The tapping unit 126 functions to turn the display unit on and off and may, in the case of a unit configured to tap into the signals provided via broadcast bus 130, operate to tune a tuner for audio or video channel selection. Alternatively, the tapping unit may operate to decode a selected digital audio or video stream in order to generate an audio or video signal.

Further details regarding an example of an IFE system are set forth in commonly owned and assigned U.S. patent application Ser. No. 10/136,237, filed May 1, 2002, entitled Method and System for Configuration and Download in a Restricted Architecture Network, herein incorporated by reference in its entirety for all purposes. See also the white paper entitled "In-flight Entertainment", B. Anantha Subramanian, Wipro Technologies, 2002, herein incorporated by reference, that generally describes IFE systems.

Problems occasionally arise with IFE systems. Service personnel must diagnose the problems in order to identify needed solutions. Conventionally, diagnosis has been performed using a personal computer, such as a laptop, which is connected onto the IFE while the aircraft is on the ground between flights or during a scheduled maintenance period. An on-site technician operates the laptop to run a diagnosis program that reports the status of the IFE components and that can identify certain problems. Unfortunately, such a conventional diagnostic system requires the on-site presence of a person to operate the computer.

SUMMARY OF THE INVENTION

A system is provided for diagnosing an IFE remotely. For example, the system comprises: a base computer, the base computer having a program for communicating over a communications network (e.g., a private network, a public wide area network, such as the Internet or the World Wide Web, or a public switched telephone network, such as a wireless telephone or a land line telephone system); a remote computer located at an aircraft site, the remote computer being connectable to an IFE installed on the aircraft, the remote computer being equipped with a diagnosis program operable to report status and problems of the IFE and a program for communicating with the base computer over the communications network.

In one embodiment, the invention provides a kit that facilitates set up of the system using the communications network. For example, the kit comprises: the remote computer, the diagnostic program adapted to run on the remote computer; connection equipment for connecting the remote computer to the IFE of an airplane (e.g. a network interface or a serial interface along with a communications driver); and connection equipment for connecting the remote computer to the communication network for point-to-point communication with the base computer (e.g. a network interface to the communications network along with a point to point communications driver). Advantageously, when the remote computer is connected to the IFE at a remote aircraft site by a remote operator, a diagnostic technician who is not located at the remote site can use the base computer to control the diagnostic program via the communications network. In other words, the diagnostic technician does not need to travel to the remote site in order to perform a diagnosis. This can save significant time and travel expense.

In a further refinement of this embodiment, the communications equipment for connecting the remote computer includes a wireless modem. For example, the wireless modem can be a cellular telephone modem.

An embodiment of a method for remotely accessing an in-flight entertainment (IFE) system for diagnosis, according to the present invention, calls for providing a remote computer having a first communication interface for communicating with the IFE system, a second communication interface for communicating with a wide area network, and a communication server process for receiving a diagnostic request message via the second interface, querying at least one unit of the IFE system responsive to the diagnostic request, receiving diagnostic information from the at least one unit of the IFE system, and sending a response message to the diagnostic request that contains the diagnostic information. This embodiment also calls for providing a base computer having a communication interface for communicating with a wide area network and a maintenance application for interfacing with a user, the base computer being configured to receive a user input identifying desired diagnostic information, transmit a request message for the desired diagnostic information via the wide area network, receive a response message containing the desired diagnostic information, and display for the user the diagnostic information from the response message. The methods also sets forth connecting the remote computer to the IFE system and establishing a communication link from the remote computer to the base computer via the wide area network. The method further recites receiving a user request for desired diagnostic information at the base computer and transmitting a request message for the desired diagnostic information from the base computer to the remote computer via the WAN. The method further calls for receiving the request message for the desired diagnostic information in the remote computer and, responsive thereto, querying at least one unit of the IFE system for the desired diagnostic information. The method also involves receiving diagnostic information from the at least one unit of the IFE system and, responsive thereto, sending a response message including the diagnostic information from the at least one unit of the IFE system from the remote computer to the base computer via the WAN. Finally, the method calls for receiving the response message including the diagnostic information from the at least one unit in the base computer and, responsive thereto, displaying the diagnostic information from the at least one unit to the user. In a further refinement of this embodiment, the second interface of the remote computer is a wireless communication interface, such as a mobile telephone interface, a radio interface, or a wireless network interface card.

An embodiment of a remote diagnostic system, according to the present invention, for remotely accessing an in-flight entertainment (IFE) system for diagnosis, includes a remote computer having a first communication interface for communicating with the IFE system and a second communication interface for communicating with a wide area network. The remote computer also has a communication server process for receiving a diagnostic request message via the second interface, querying at least one unit of the IFE system responsive to the diagnostic request, receiving diagnostic information from the at least one unit of the IFE system, and sending a response message to the diagnostic request that contains the diagnostic information. The system also includes a base computer having a communication interface for communicating with a wide area network. The base computer includes a maintenance application for interfacing with a user, receiving a user input identifying desired diagnostic information, transmitting a request message for the desired diagnostic information via the wide area network, receiving a response message containing the desired diagnostic information, and displaying for the user the diagnostic information from the response message. In a further refinement of this embodiment, the second interface of the remote computer is a wireless communication interface, such as a mobile telephone interface, a radio interface, or a wireless network interface card.

BRIEF DESCRIPTION OF THE DRAWINGS

A description of certain embodiments of the present invention appears below with reference to the following drawings, wherein.

DETAILED DESCRIPTION OF THE INVENTION

Figure 1:
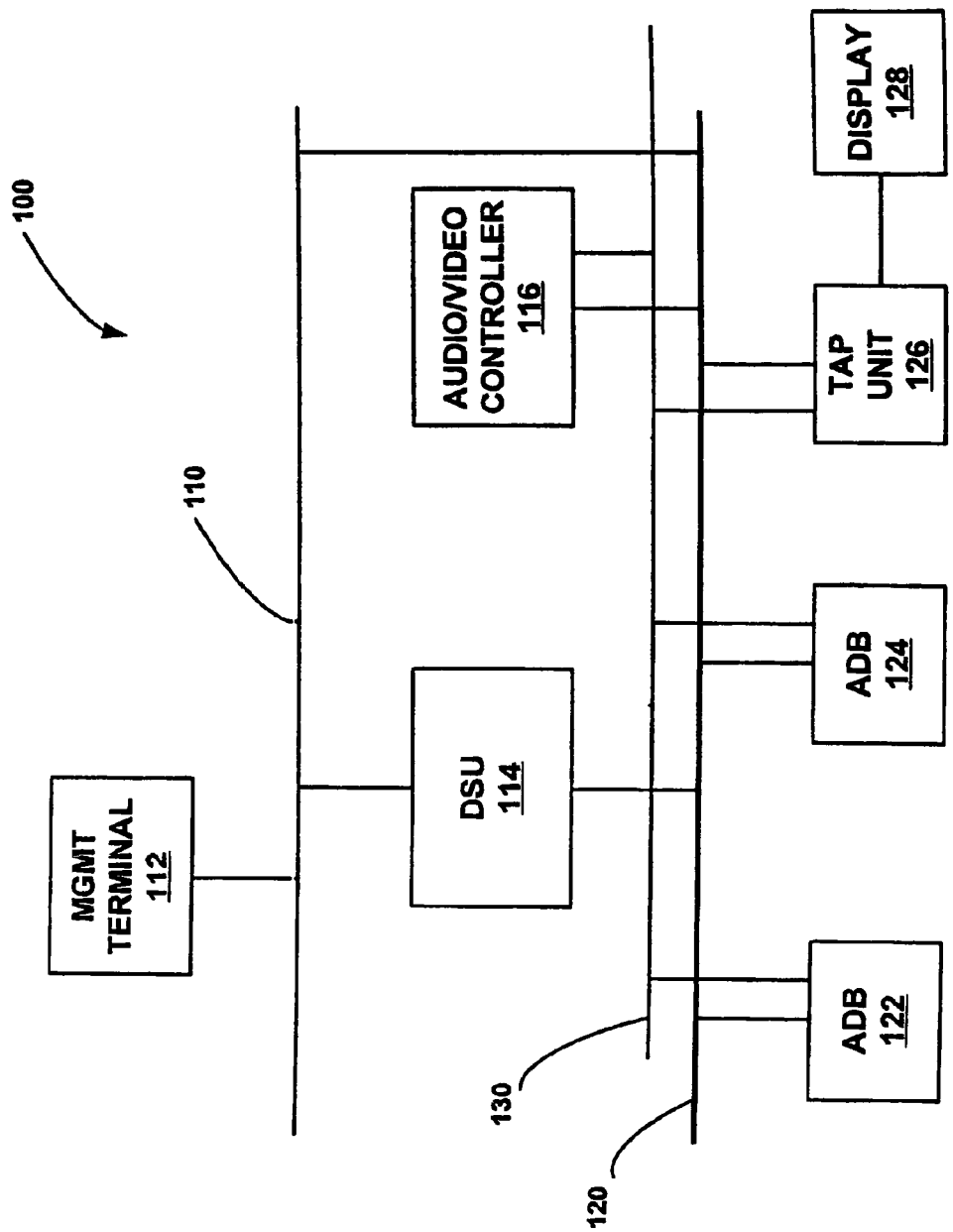
FIG. 1 is a function block diagram illustrating an architecture for an in-flight entertainment system.
Figure 2:
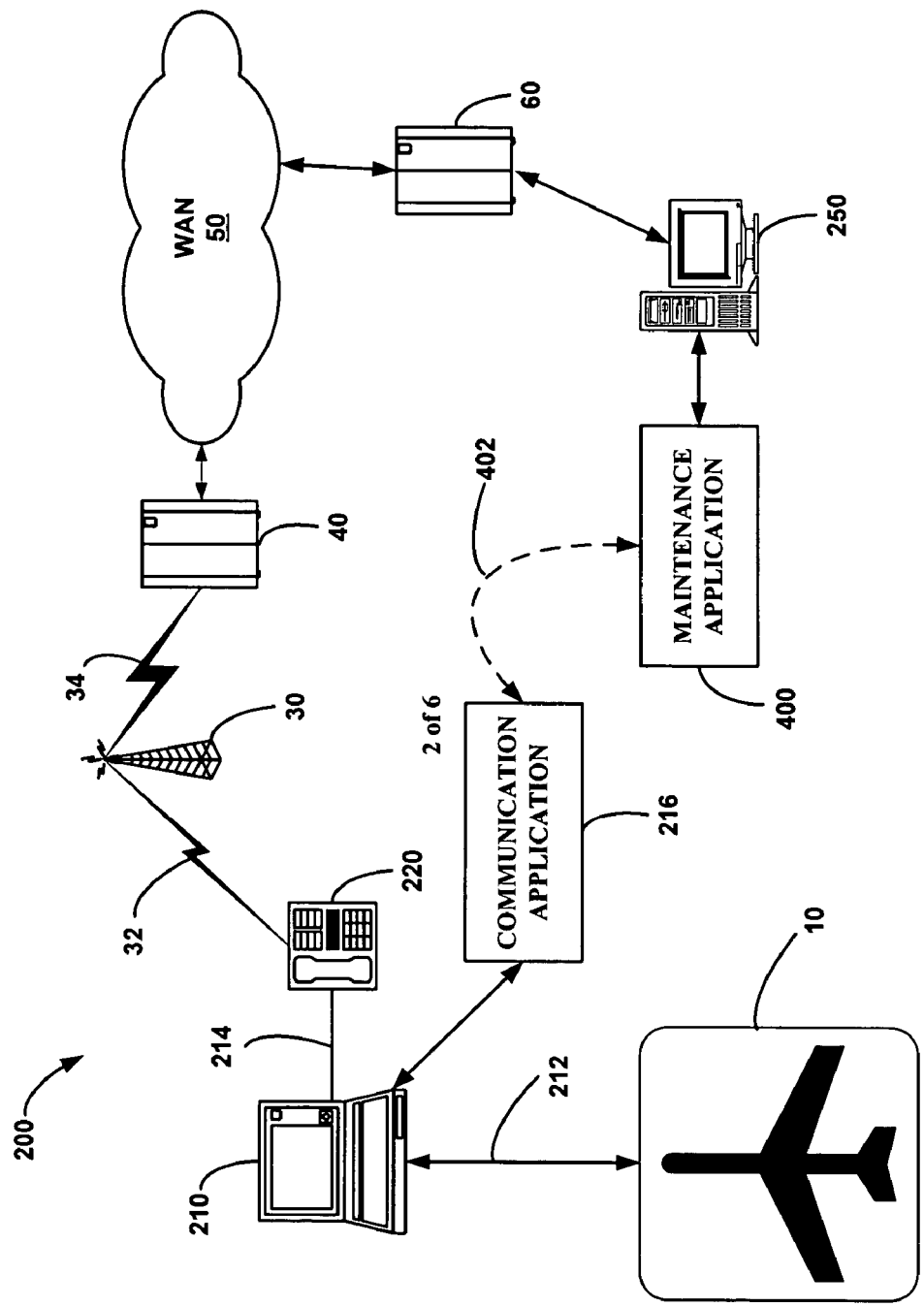
FIG. 2 is a schematic illustration of an environment in which an embodiment of a remote diagnostics kit, in accordance with the present invention, is used, including a base computer, a remote computer connected to an aircraft, and an exemplary network for remotely communicating between the base computer and remote computer.

Now referring to the Figures, FIG. 2 illustrates a system that includes a remote diagnostics kit that permits an in-flight entertainment system of an aircraft, such as the IFE system shown in FIG. 1, to be diagnosed remotely by an operator who is not on-site with the aircraft. According to one aspect of the invention, a remote diagnostics kit is provided for use in the system of FIG. 2. The system includes a remote computer 210 and a base computer 250 that are adapted for communication over a network or combination of networks, such as a public wide area network (e.g., the World Wide Web or the Internet), the public switched telephone system (e.g. a wireless telephone network or a land-line telephone network), or both.

The kit includes remote computer 210, as illustrated in FIG. 2, which may be a personal computer, such as a laptop, a personal data appliance (PDA), or other computing device and may include an operating system program, e.g. Linux, Windows, Unix, Macintosh, Palm or other suitable operating systems. The remote computer 210 is connectable to the IFE backbone, e.g. local area network 110 of FIG. 1, or to a component thereof, e.g. a network router or communication server coupled to the IFE network. For example, the remote computer communication link 212 to the IFE 100 on aircraft 10 can be a network interface, such as an Ethernet port, wherein a RJ45 CAT-5 cable is used to connect a network interface port of the remote computer to the network of the IFE. Alternatively, remote computer 210 may be connected to the IFE via a serial interface to a particular IFE component, such as a DSU 114 or other line replaceable unit (LRU) of the IFE, via a serial communications link, such as an RS-232 interface.

The remote computer runs a diagnostic program that diagnoses the IFE or its individual components in a manner that will be understood to those of ordinary skill in the art. One example of such a diagnostic program is an application for testing the connectivity of the network devices connected to the IFE system, e.g. a Thales iSeries network, that returns an IP address and LRU serial number for the LRUs active in the IFE network. Another example is an LRU test program that interacts with local level test tools that may be used to test some of the internal components of an LRU as well as the software functionality of an LRU. Still another example is a diagnostic program for testing an ARINC 429 connection and obtaining aircraft flight data, where the aircraft flight data are transmitted on an ARINC 429 standard data bus from the aircraft to the IFE system. A wide variety of applications may be suitable for use in maintaining the FE and its components.

The remote computer 210 includes communication equipment for communicating over a network, as will be explained in greater detail below. The network provides a communication path from remote computer 210 to base computer 250 and, generally, may include public switched telephone lines (such as wireless telephone networks or land-line telephone networks) wide area networks (such as the World Wide Web or the Internet) or a combination of both. In one embodiment, a virtual communication link 402 is established between a communication or maintenance application 216 in remote computer 210 and maintenance application 400 in base computer 250. The virtual communication link 402 is realized through the actual communication link through a wide area network or networks and is discussed in further detail below.

In the example of FIG. 2, remote computer 210 includes a wireless modem or wireless network card, or is connected to a mobile telephone, which are represented by wireless communication device 220. The wireless communication device 220 communicates with a wireless communication site 30, such as a wireless access point or, as in the example shown, a cellular communication site, via wireless link 32. Communication site 30, in the example shown, has a communication link 34 to a switch or server 40, which provides an interface to WAN 50. WAN 50 is also connected to communication server 60, which provides network access to base computer 250. This communication path also generally provides for return communication.

Figure 3:
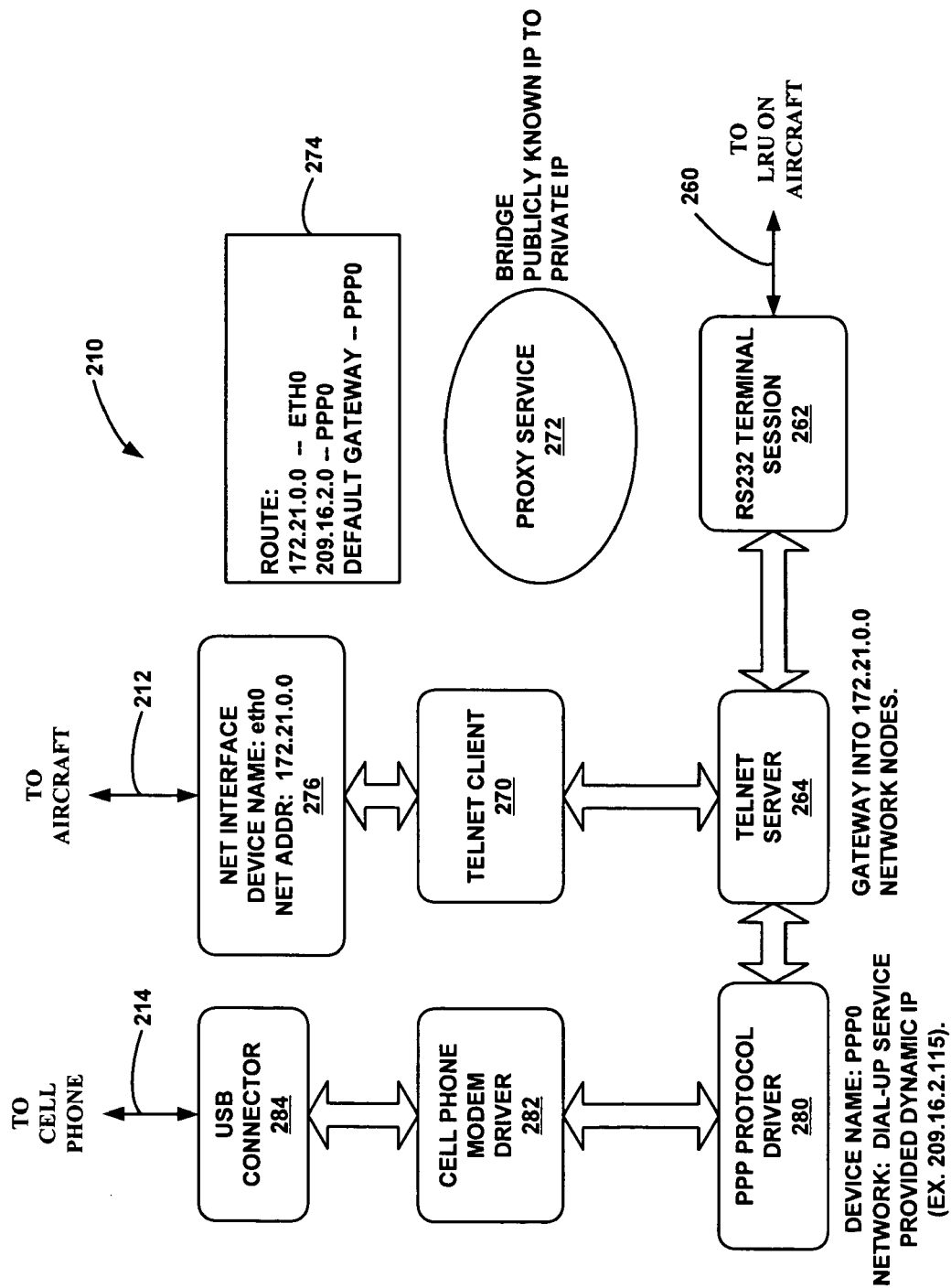
FIG. 3 is a schematic diagram illustrating an exemplary embodiment of the remote diagnostics computer of FIG. 2 in accordance with one aspect of the present invention.

FIG. 3 is a functional block diagram illustrating one embodiment of remote computer 210 of FIG. 2, wherein remote computer 210 is coupled to a wireless telephone for communication with a wireless telephone network. This embodiment of remote computer 210 is coupled to the wireless telephone via a Universal Serial Bus (USB) connector 284 and includes a communications driver, cell phone modem driver 282, for handling communications between the remote computer and the wireless telephone network. For other communications configurations, e.g. a wireless modem, other types of software drivers may be employed to handle communications. In this example, the mobile telephone wirelessly connects to the telephone network, which in turn communicates with the Internet, e.g. WAN 50, through an Internet service provider ("ISP"), e.g. server 40. Alternatively, the remote computer 210 may include a wireless network interface card for wireless data communications with a wireless access point using a wireless communication driver. A point to point protocol (PPP) driver 280 may also be provided to handle the serial communications between the remote computer 210 and the base computer 250.

Also shown in the example of FIG. 3 is a network interface device 276, such as a network interface card, for communicating with the IFE system of the aircraft 10 of FIG. 2. The network interface device has an Ethernet device name "eth0" for communicating with the IFE system, e.g. network 110 of FIG. 1, and has an IP network address of "172.21.0.0" for communication via WAN 50. A network telecommunications client process 270 handles communications between the remote computer 210 and the IFE network via network interface device 276.

In the embodiment shown, a Telnet server 264 handles, at a data link layer, the communications between remote computer 210 and base computer 250 and provides a service access point to the network nodes of the IFE through a gateway address, e.g. 172.21.0.0, for the IFE network. See request for comment (RFC) 854 from the Internet Engineering Task Force, herein incorporated by reference, for further details of the Telnet protocol. The communications are passed through to a Telnet client 270, which permits the technician at base computer 250, through a Telnet session, to take control of remote computer 210. A routing table 274 contains mapping information for that is used by PPP driver 280 to map communications over a point-to-point link to base computer 250 utilizing dynamically allocated IP addresses for the computers, e.g. 209.16.2.115 and 209.16.2.0. The routing table also provides mapping information for mapping the network address of network interface 276, e.g. 172.23.0.0 to the device name for the network interface on the IFE network. If individual units of the IFE system are to be addressable, then additional entries may appear in routing table 274 for mapping of, for example, service ports to each individual units of the IFE system using proxy service 272.

The example of FIG. 3 also provides for a direct serial link to an individual LRU of the IFE system via RS232 terminal session driver 262, which may be connected to a unit via an RS232 serial link 260. Communications between the RS232 serial port and the base computer are also handled, in this example, via Telnet server 264.

Figure 4:
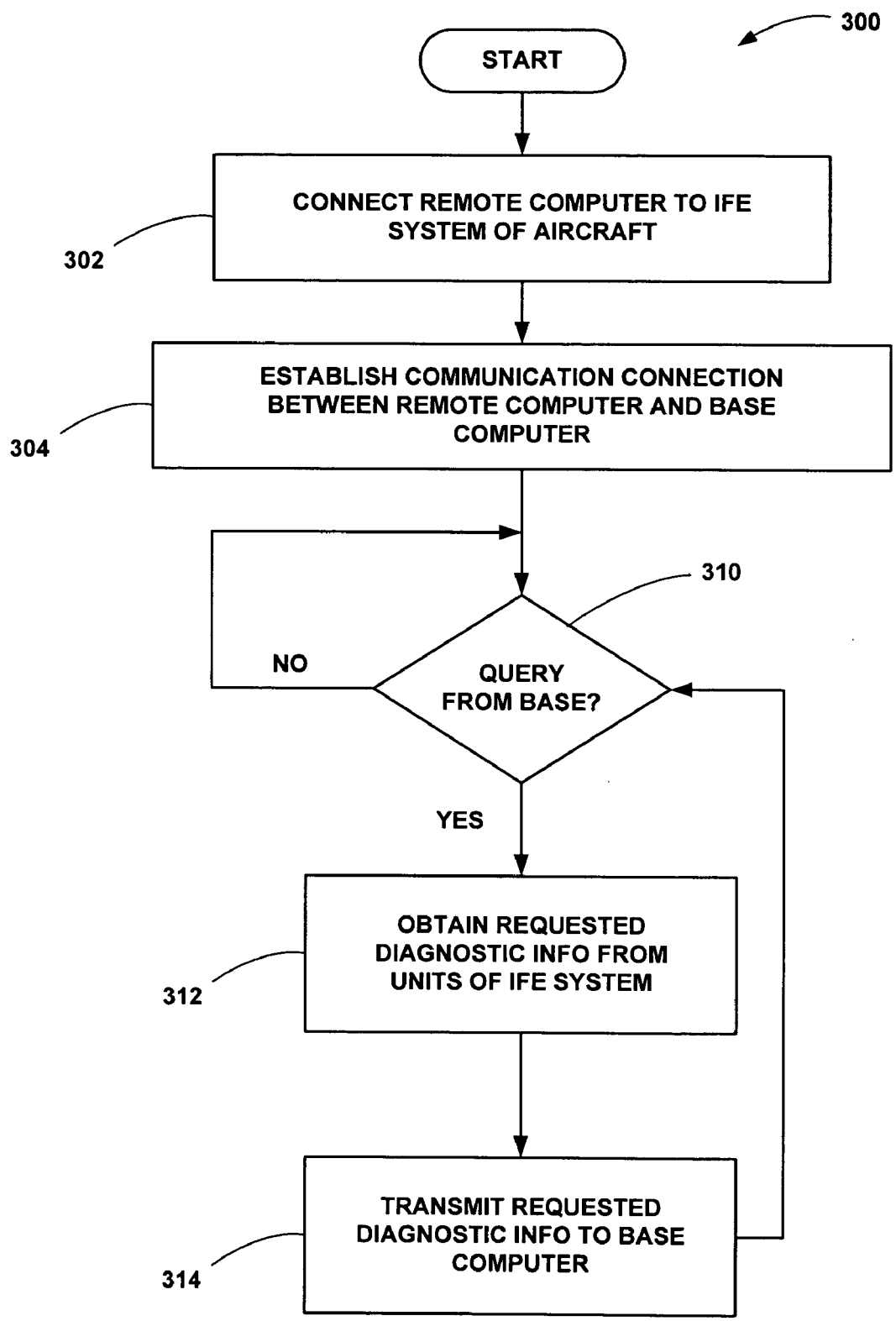
FIG. 4 is a control flow diagram illustrating an exemplary embodiment of the function of a communications server in the remote computer of FIGS. 2 and 3.

FIG. 4 is a control flow diagram illustrating one embodiment of a maintenance process 300 in remote computer 210 that establishes a communication link with the base computer. When process 300 is initiated, it establishes a communication connection, at step 302, with the IFE system of the aircraft. It also establishes a communication connection, at step 304, between the remote computer and the base computer. Alternatively, the maintenance process may be configured to permit the base computer to establish the communication session, in which case the maintenance process in the remote computer awaits a request for establishment of the communication session from the base computer. In the embodiment shown, once the communication connection is established with the base computer at step 304, process 300 looks for a query, such as a command or other request message from the base computer, at step 310. When a query is received, such as a query for diagnostic information from one or more units of the IFE system, the remote computer obtains, at step 312, the requested information from a unit or units of the IFE system. This may be accomplished by a program in the remote computer transmitting a command to a unit of the IFE system via the network of the IFE system and waiting for reception of a responsive message from the unit of the IFE system. Alternatively, process 300 merely relays commands generated from a program at the base computer onto the network of the IFE system and responses from the IFE system to the base computer. At step 314, the responsive diagnostic information from the IFE system is sent to the base computer.

The base computer also includes a means for accessing a public network. The base computer may also access the communications network through a network interface or telephone modem. The base computer and remote computer are equipped with appropriate software to permit communication between the base and remote computers. In one embodiment, the base computer and remote computer are adapted to communicate using a point-to-point protocol. Accordingly, using the base computer, the technician can command and control operation of a diagnostics program running at the remote computer using the communications network. Similarly, output from the diagnostics program on the remote computer can be transmitted to the base computer via the communications network. The output from the remote computer can be displayed at the base computer for evaluation by the diagnostic technician.

Figure 5:
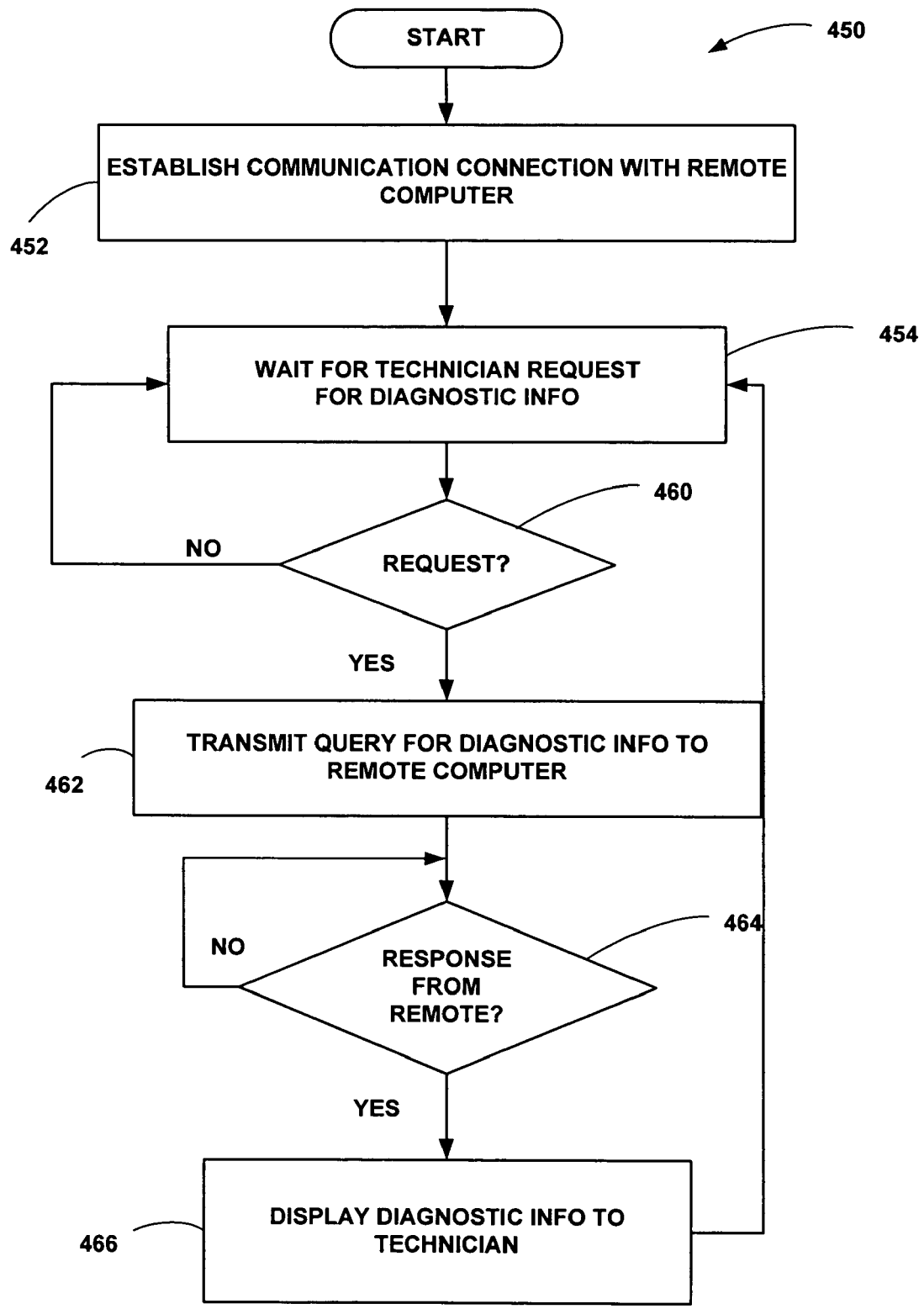
FIG. 5 is a control flow diagram illustrating an exemplary embodiment of the function of a maintenance application in the base computer of FIG. 2.

FIG. 5 is a control flow diagram illustrating an embodiment of a process 450 in base computer 250 for use by a technician in diagnosing the IFE system of an aircraft via remote computer 210. When process 450 is initiated, a communication connection is established with the remote computer at step 452. As noted above, the processes in the remote computer and base computer may be configured such that the communication session can be initiated by either computer. At step 454, process 450 waits for a technician request, such as a request for diagnostic information from the IFE system, as shown in the example, or input of a command for the IFE system. Process 450 looks for the request at step 460. When a technician request is received, it is transmitted to the remote computer at step 462 via the wide area network communication link. Process 450 then awaits a response from the remote computer at step 464. Once the response is received, the information from the response, such as diagnostic information from the IFE system, as in the example shown, or a response to a command, are displayed for the technician at step 466.

As noted above, the remote computer 210 may also be connected to a unit of the IFE system via a serial interface, such as a RS-232 interface. In this case, the commands or queries received from the base computer are relayed to the unit of the IFE system by the remote computer via the serial interface to the unit. Responses from the unit are similarly relayed back to the base computer.

Figure 6:
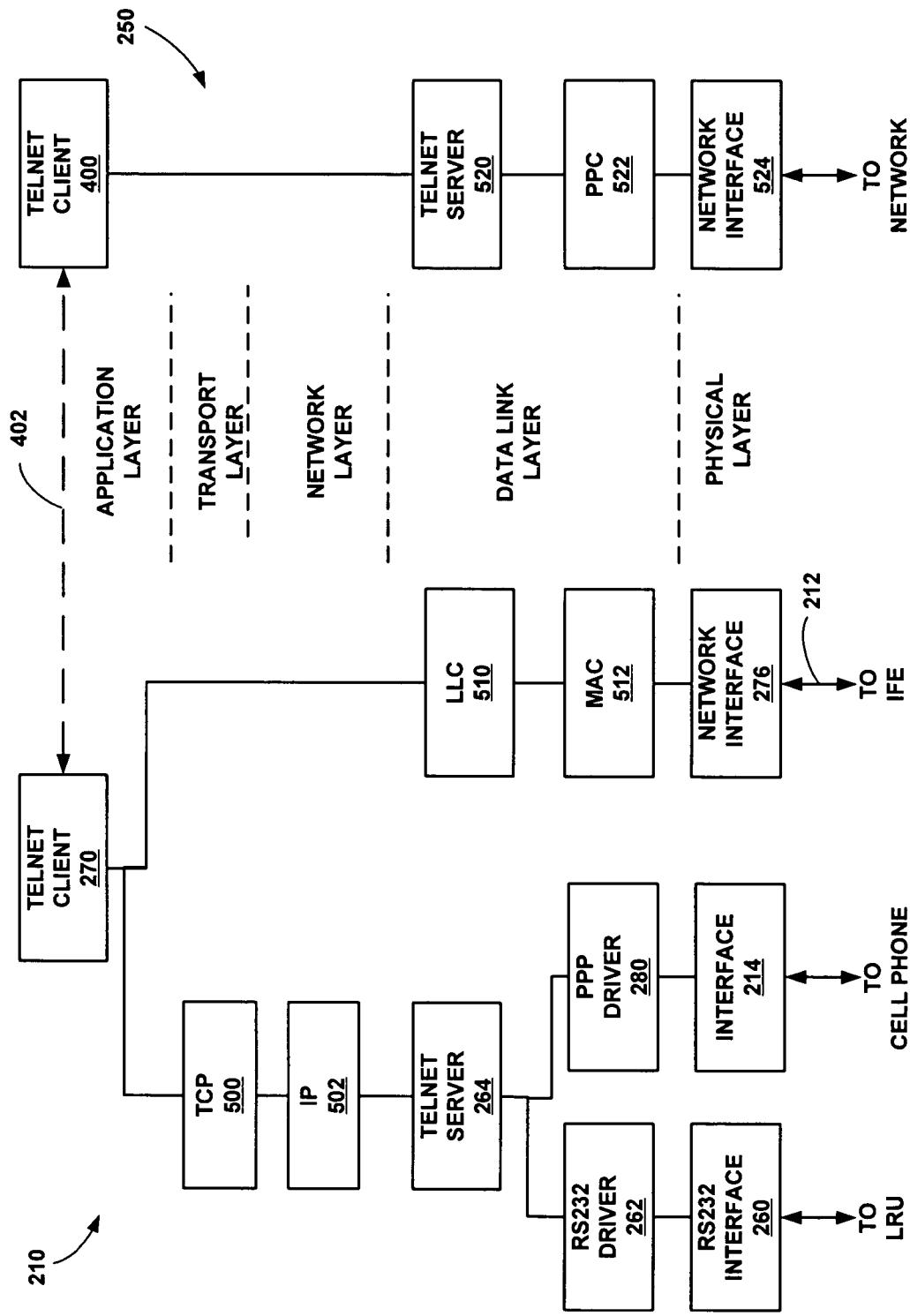
FIG. 6 is a layer diagram illustrating an example of the communications processes constituting the communication link between the remote and base computers of FIG. 2.

FIG. 6 is a network layer diagram illustrating the protocol stack involved in one embodiment of the present invention for the communication link between the remote computer 210 and base computer 250. As discussed above, communication through the cell phone interface 214 involves a PPP driver 280 at the data link layer as well as the Telnet server 264. RS232 driver 262, which is a simple framing protocol for serial communications, also interacts with the Telnet server 264 for communication with the base computer. As data packets pass up the protocol stack from the Telnet server, they pass through the Internet Protocol (IP) 502 at the network layer, which handles routing issues involving the WAN 50 and the Transmission Control Protocol (TCP) 500 at the transport layer, which handles communications using ports and provides a virtual connection to the Telnet client 270. The Telnet client 270 communicates with the network interface 276 to the IFE network through a logical link controller 510 and a medium access controller 512.

The Telnet client 270 is one embodiment of an application for use in the remote computer 210 that permits a technician using the base computer 250 to take control of the remote computer 210. Telnet client 270 in the remote computer 210 has a virtual link 402, provided through the communications path to the cell phone or similar access to the WAN, to a Telnet client 400 in base computer 250. In the example shown, Telnet client 400 communicates through a point-to-point connection through the public network to the remote computer 210. In this example, the protocol stack in base computer 250 includes a Telnet server 520 and a point-to-point protocol (PPP) at the data link layer that communicates with a network interface 524 to the network. Thus, a point-to-point link can be established between the PPP level 280 in the remote computer 210 and the PPP level 522 in the base computer 250. The Telnet client is able to make system calls within the remote computer under control of the Telnet session in the base computer. Other application programs are available, such as PCanywhere from Symantec, that also permit a remote user to take control of a system in order to execute programs.

Other approaches are possible for establishing the virtual link 402 between applications in the remote computer 210 and base computer 250 for purposes of remotely controlling the operation of the remote computer 210. For example, the virtual link may be established by tunneling command and information data between the remote and base computers using tunnels through the public network. The Layer Two Tunneling Protocol (L2TP) or Point-to-point tunneling protocol (PPTP) are examples of protocols that provide this type of capability.

In view of the wide variety of embodiments to which the principles of the present invention can be applied, it should be understood that the illustrated embodiments are exemplary only, and should not be taken as limiting the scope of the present invention. For example, a variety of communications equipment and software may be utilized to perform certain functions of the present invention. Also, a variety of different approaches may be employed to connect to and communicate with the equipment that is being diagnosed including, but not limited to, network connections (wireless and cable based) and serial (wireless, infrared, and cable based).

What is claimed is:

1. A remote access system for diagnosing at least one target component of an IFE on an aircraft, the system comprising:
    an IFE interface onboard the aircraft, the IFE interface being in communication with the at least one target component;
    a base computer, the base computer being equipped with a base program and first communication equipment for connecting the base computer to communicate over a communications network;
    a remote computer located at an aircraft site, the remote computer being conveyable onboard the aircraft and removably connectable to the IFE interface, the remote computer being equipped with a diagnostic program operable to analyze the at least one target component of the IFE when the remote computer is connected to the IFE interface, and to generate output; and
    second communication equipment for connecting the remote computer to communicate over the communications network with the base computer wherein the diagnostic program at the remote computer receives input from the base computer and wherein the remote computer transmits output to the base computer,
    wherein the base program is configured to send at least one command to the diagnostic program at the remote computer and receive output from the diagnostic program at the remote computer in response to the at least one command, and
    wherein, based on the command received from the base program, the remote computer queries the at least one target component of the IFE and sends a query response to the base computer.

2. The system of claim 1, wherein the second communication equipment for connecting the remote computer includes a wireless modem.

3. The system of claim 2, wherein the wireless modem is a cellular telephone modem.

4. A method for remotely accessing an in-flight entertainment (IFE) system for diagnosis, the method comprising the steps of:
    providing a remote computer having a first communication interface for communicating with the IFE system, a second communication interface for communicating with a wide area network (WAN), and a communication server process for receiving a diagnostic request message via the second interface, querying at least one target unit of the IFE system responsive to the diagnostic request, receiving diagnostic information from the at least one target unit of the IFE system, and sending a response message to the diagnostic request that contains the diagnostic information;
    providing a base computer having a communication interface for communicating with a wide area network and a maintenance application for interfacing with a user, the base computer being configured to receive a user input identifying desired diagnostic information, transmit a request message for the desired diagnostic information via the wide area network, receive a response message containing the desired diagnostic information, and display for the user the diagnostic information from the response message;
    conveying the remote computer onboard the aircraft;
    establishing a temporary physical connection between the first communication interface of the remote computer and an IFE interface onboard the aircraft, the IFE interface being in communication with the at least one target unit of the IFE system;
    establishing a communication link from the remote computer to the base computer via the wide area network;
    receiving a user request for desired diagnostic information for the at least one target unit of the IFE system at the base computer;
    transmitting a request message for the desired diagnostic information from the base computer to the remote computer via the WAN;
    receiving the request message for the desired diagnostic information in the remote computer and, responsive thereto, querying the at least one target unit of the IFE system for the desired diagnostic information;
    receiving diagnostic information from the at least one target unit of the IFE system and, responsive thereto, sending a response message including the diagnostic information from the at least one target unit of the IFE system from the remote computer to the base computer via the WAN; and
    receiving the response message including the diagnostic information from the at least one target unit in the base computer and, responsive thereto, displaying the diagnostic information from the at least one unit to the user.

5. The method of claim 4, wherein the second communication interface of the remote computer is a wireless communication interface.

6. The method of claim 5, wherein the wireless communication interface is selected from the group consisting of a mobile telephone interface, a radio interface, and a wireless network interface card.

7. The method of claim 4 further comprising the step of establishing through the temporary physical connection a communication link from the remote computer to the at least one target unit of the IFE system.

8. The method of claim 7 wherein the step of establishing through the temporary physical connection a communication link from the remote computer to the at least one target unit of the IFE system is performed before the step of establishing a communication link from the remote computer to the base computer via the wide area network.

9. The method of claim 7 wherein the step of establishing through the temporary physical connection a communication link from the remote computer to the at least one target unit of the IFE system is performed after the step of establishing a communication link from the remote computer to the base computer via the wide area network.

10. A remote diagnostic system for remotely accessing at least one target unit of an in-flight entertainment (IFE) system on an aircraft for diagnosis, the system comprising:
    an IFE interface onboard the aircraft, the IFE interface being connected to an aircraft communication network linked with the at least one target unit;
    a remote computer being conveyable onboard the aircraft and removably connectable to the IFE interface, the remote computer having a first communication interface for communicating with the IFE system, a second communication interface for communicating with a wide area network (WAN), and a communication server process for receiving a diagnostic request message via the second interface, querying the at least one target unit of the IFE system via the aircraft communication network in response to the diagnostic request, receiving diagnostic information from the at least one target unit of the IFE system via the aircraft communication network, and sending a response message to the diagnostic request that contains the diagnostic information; and a base computer having a communication interface for communicating with a wide area network and a maintenance application for interfacing with a user, the base computer being capable of receiving a user input identifying desired diagnostic information, transmitting a request message for the desired diagnostic information via the wide area network, receiving a response message containing the desired diagnostic information, and displaying for the user the diagnostic information from the response message.

11. The system of claim 10, wherein the second communication interface of the remote computer is a wireless communication interface.

12. The system of claim 11, wherein the wireless communication interface is selected from the group consisting of a mobile telephone interface, a radio interface, and a wireless network interface card.

* * * * *